Oct. 11, 1966  KAZUO SUGIMURA  3,277,925
ACCUMULATOR

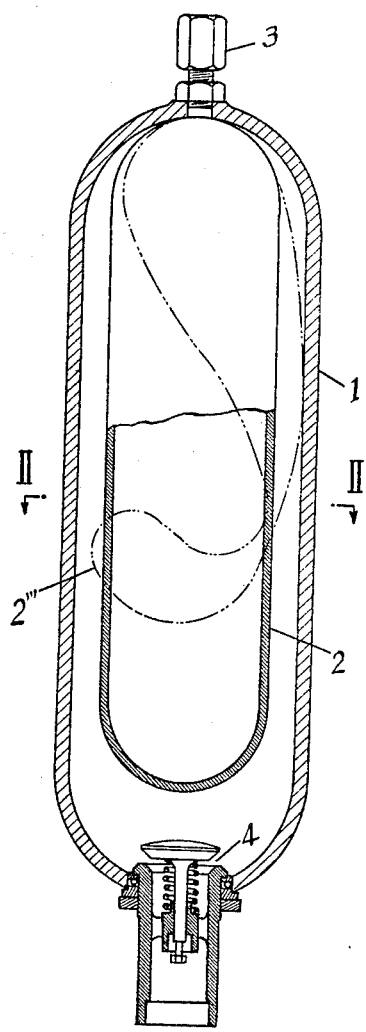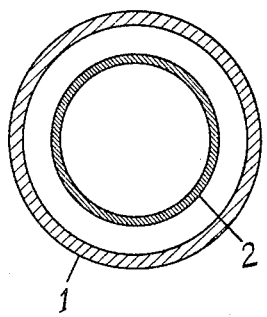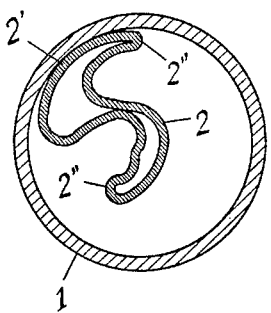

Filed June 4, 1963  3 Sheets-Sheet 3

Inventor
Kazuo Sugimura
By Alvin Browdy
attorney

United States Patent Office 3,277,925
Patented Oct. 11, 1966

3,277,925
ACCUMULATOR
Kazuo Sugimura, 1416 Sodeshicho, Shimizu-shi,
Shizuoka, Japan
Filed June 4, 1963, Ser. No. 285,433
6 Claims. (Cl. 138—30)

This invention relates to improvements in an accumulator to be used as a pressure accumulator for oil pressure apparatus and hydraulic apparatus or as a shock absorber.

In a conventional accumulator, a cylindrical bag is mounted in a liquid tank, a liquid is contained in said liquid tank and a gas is contained in said bag so that, when the pressure of the liquid increases or decreases, the gas in the bag may be compressed or expanded to deform the bag.

The gas pressure in the gas bag always balances that of the liquid in the liquid tank, the gas bag deflating to accumulate pressure liquid in the liquid tank from, and inflating to discharge pressure liquid out of the liquid tank, to a pressure circuit.

The important desirable features for the gas bag are that the bag inflate and deflate smoothly and regularly in a certain designed manner, and that when it is deflated it does not collapse into irregular shapes both in crosswise and longitudinal directions, as to be described later.

So long as the flexible wall of the gas bag of cylindrical form works under tension, the bag keeps its cylindrical natural shape, but when the bag is compressed and deflated, as soon as the tension within the wall is reduced, and the tension becomes zero, hereafter defined as the inflection point, the cylindrical wall of the bag, normally made of a uniform thickness, begins to deform at random and to lose its cylindrical shape. As the bag is further deflated, it will at last be collapsed crosswise and/or lengthwise as shown in FIGS. 1 and 3. As shown in FIG. 3, the bag collapses into an irregular shape as shown in dot-dash lines, forming such sharp bends as (2″) which causes the wall eventually to be broken.

Moreover, such irregular deformations as above mentioned will cause the bag to shift from the center line of the liquid tank, and will cause the portion of the wall of the gas bag (2′) to rub against the inner wall of the liquid tank and will damage the said portion by friction. The bag will also be collapsed lengthwise and folded into two as shown by (2‴) in FIG. 1.

Therefore, it is necessary that the amount of the liquid coming into and out of the liquid tank be restricted so as to prevent such phenomenon as is described above.

However, if the amount of the liquid is so restricted, there is the disadvantage that the number and capacity of the accumulators will have to be increased and the equipment will have to be made larger.

An object of the present invention is to improve such defects of the conventional accumulator as are described above.

The structure in accordance with the present invention is an accumulator wherein a cylindrical bag is contained in a cylindrical liquid tank and several reinforced pressure-resisting parts and unreinforced parts which extend longitudinally in the same direction as of the length of said bag are formed in the bag and are alternately arranged along the periphery of the bag, as shown in FIGS. 6, 9, 12 and 15, so that the bag may deflate to designed regular shapes as shown.

The present invention shall now be explained with reference to the accompanying drawings in which:

FIGURE 1 is a longitudinally sectioned view of a conventional accumulator;

FIGURE 2 is a cross-sectioned view on line II—II in FIG. 1;

FIGURE 3 is a cross-sectioned view showing the part in FIG. 2 as deformed;

In FIGS. 1 to 3 there is illustrated the conventional accumulator in which 1 is a liquid tank made of a metal and 2 is an air bag formed of such elastic material as rubber. Air is contained in said air bag. A pressure liquid is contained in the liquid tank 1.

2′ is shown to be a part of the bag which is rubbing the inner wall of the liquid tank 1. 2″ is a sharply bent part of the air bag 2. Such parts are likely to be damaged.

2‴ is the bag as bent in the direction of its length. 3 is an air inlet and outlet port. 4 is a liquid inlet and outlet port.

Figure 4:
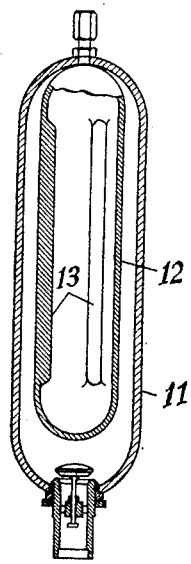
FIGURE 4 is a longitudinally sectioned view of a first embodiment of the present invention.
Figure 5:
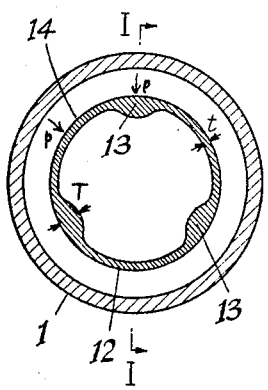
FIGURE 5 is a magnified cross-sectioned view on line V—V in FIG. 4.
Figure 6:
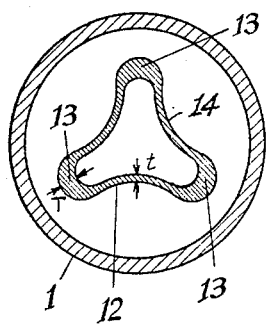
FIGURE 6 is a cross-sectioned view showing the part in FIG. 5 as deformed.

FIGURES 4 to 6 represent the first embodiment of this invention. FIGURE 5 is a cross section of the accumulator, and FIG. 4 is a longitudinal section through I—I in FIG. 5. A flexible gas bag 12 made of an elastic material, such as rubber, is equipped in the same way as conventional accumulators in a liquid tank 11, which is of the same shape and of the material as that of the conventional accumulators as shown in FIG. 1.

The gas bag 12 is reinforced in such a way that the thickness T of narrow and straight longitudinal portions 13 of the cylindrical wall of the bag is made thicker than the thickness t of the cylindrical wall 12, at a plurality of equally spaced locations along the periphery in its cross-section, as shown in FIGS. 4 and 5.

These straight longitudinal thick portions 13 resist the external fluid pressure more strongly than the cylindrical wall 12 of thinner thickness and the thinner parts 12 will yield radially and inwardly towards the center of the bag, as shown in FIG. 6. Therefore, when the bag is pressed and deflated beyond the inflection point, it will deflate to form a straight column whose cross section is of a shape like an asteriodea with round tip arms as designed, as shown in FIG. 6.

The gas bag, being thus deflated regularly to form a straight column with geometrical cross section like an asteroidea, never collapses at random into such a form in cross section as 2 in FIG. 3, and is strong enough to resist against any forces to fold and bend, and keeps its straight form of column, without being bent as 2‴ in FIG. 1.

Thus, the reinforced bag of this invention takes the form of a straight cylindrical column when inflated, and when deflated it takes the form of a straight column whose cross section is like an asteroidea as designed. In other words, the gas bag always keeps a form of straight column whose cross section becomes circle or asteroidea form as the bag inflates or deflates due to the decrease or increase of the oil pressure.

Moreover, the center line of the said column always keeps straight and always remains on the center line of the oil tank. Thus, the bag never touches the inner surface of the oil tank, which causes no friction between them.

Therefore, the gas bag can deflate or inflate sensibly to meet the increase or decrease of the oil pressure without any resistance, as the result of which, pulsations or hydraulic shocks due to the sudden change of pressure in the pressure hydraulic system are instantly absorbed and elminated by the accumulator.

The gas bag does not collapse irregularly when deflated extremely, as represented in FIG. 6, where the inner surface of the gas bag contacts with each other within the arm of asteroidea, without any trouble, until its inner volume becomes zero. Thus, the capacity of the present accumulator is much larger than that of a conventional one.

Figure 7:
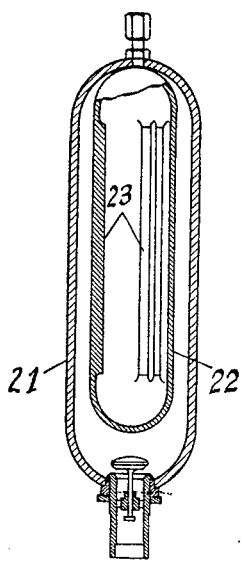
FIGURE 7 is a longitudinally sectioned view of a second embodiment of the present invention.
Figure 8:
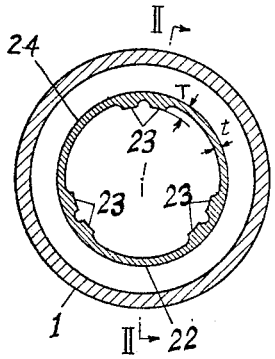
FIGURE 8 is a magnified cross-sectioned view on line VIII—VIII in FIG. 7.
Figure 9:
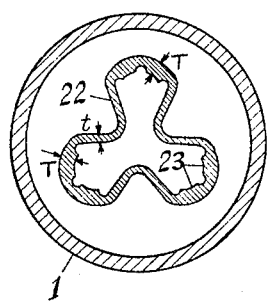
FIGURE 9 is a cross-sectioned view showing the part in FIG. 8 as deformed.

The second embodiment of the invention is shown in FIGS. 7 to 9 where 21 is the liquid tank and 22 is the gas bag. FIG. 8 is a cross section of the accumulator, and FIG. 7 is the longitudinal section through II—II of FIG. 8.

The reinforcement in the first embodiment is of a single row as above described, while the reinforcement in the second embodiment is of double rows as represented by 23 in FIGS. 7 and 8. In other respects, the second embodiment is quite the same as the first.

A gas bag, with such reinforcement 23 of double rows as shown in FIGS. 7 and 8, has stronger resistance against longitudinal bending than the first embodiment, because owing to the narrow channel between the thick strips of double rows 23, the bag is more flexible for circumferential bending along the reinforced portion, so that the bag may easily be deflated to a straight column with a cross section like an asteroidea as represented in FIGURE 9.

Figure 10:
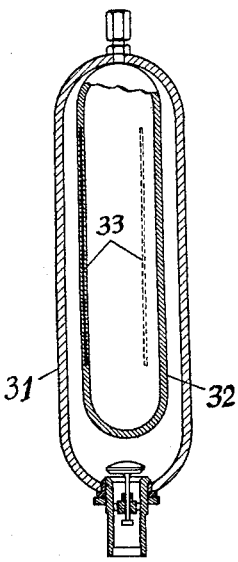
FIGURE 10 is a longitudinally sectioned view of a third embodiment of the present invention.
Figure 11:
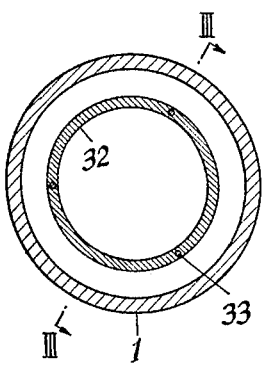
FIGURE 11 is a magnified cross-sectioned view on line XI—XI in FIG. 10.
Figure 12:
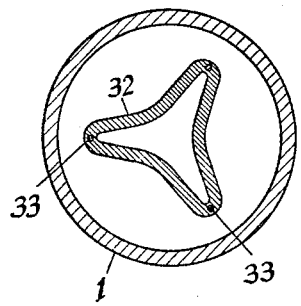
FIGURE 12 is a cross-sectioned view showing the part in FIG. 11 as deformed.

The third embodiment is shown in FIGS. 10 to 12 where 31 is the liquid tank and 32 is the gas bag. FIG. 11 is a cross section and FIG. 10 is the longitudinal section aolng III—III in FIG. 11.

Instead of reinforcing the bag by making its wall thicker at its longitudinal portions as in the first and second embodiments, the bag 32 is reinforced by straight wires 33 of material such as a metal or a hard synthetic resin, each of which is cast longitudinally within the cylindrical wall of the gas bag 32 at equally spaced intervals along the circumference of cross section, as shown in FIGS. 10 and 11.

This reinforcement, being evidently an alteration of that of the first embodiment, offers the same characteristics as the first embodiment. And therefore, it is clear that the gas bag 32 with the reinforcement of wires 33, cast within the wall, will inflate and deflate in the same way as the first two embodiments. FIGS. 12 is the cross-sectional view of the deflated form of the gas bag 32.

Figure 13:
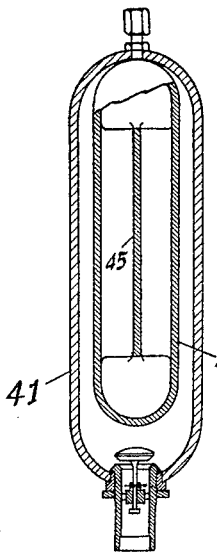
FIGURE 13 is a longitudinally sectioned view of a fourth embodiment of the present invention.
Figure 14:
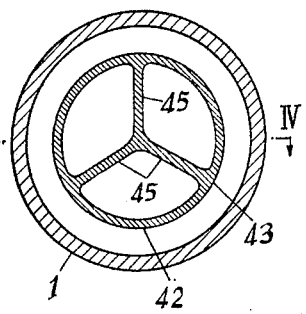
FIGURE 14 is a magnified cross-sectioned view on line XIV—XIV in FIG. 13.
Figure 15:
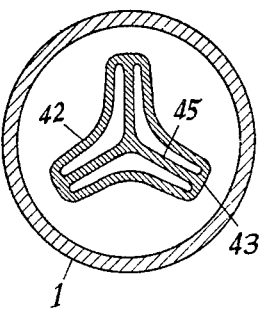
FIGURE 15 is a cross-sectioned view showing the part in FIG. 14 as deformed.

The fourth embodiment is shown in FIGS. 13 to 15 in which 41 is the oil tank, and 42 is the gas bag. FIG. 14 is a cross section and FIG. 13 is a longitudinal section through IV—IV of FIG. 14.

In this embodiment, the bag is reinforced by a longitudinal straight column 45 whose cross section is like an asteroidea with several arms of the same material as the gas bag and cast integrally with and longitudinally along the cylindrical wall of the bag 42.

The gas bag with this reinforcing column 45 will resist more strongly against the external pressure along the jointing line 43 of the cylindrical wall 42 and the arm of column 45 than along its plane cylindrical wall 42, and will be deflated to a designed form of a column whose cross section is also like an asteroidea as shown in FIG. 15, and has the same or better characteristics as the other three embodiments.

The gas bag in the accumulator, which is reinforced as in the embodiments above described, will never fail to be deflated by the external fluid pressure to form a straight column of geometrical cross section like an asteroidea as designed, and to be inflated to recover its natural straight cylindrical form when fluid pressure is decreased, always keeping its longitudinal center line on that of the liquid tank.

Consequently, it is clear by the above description and it has been actually proved that the accumulator of this invention has much larger capacity both in liquid accumulating and in shock absorbing, and that it has much longer service than the conventional accumulators.

What is claimed is:

1. An accumulator comprising a cylindrical liquid tank and a generally cylindrical gas bag disposed within the tank, said gas bag being formed of a flexible and elastic material having exactly three individual longitudinal reinforcements spaced equidistantly about the periphery of the side wall of said gas bag to minimize stretching of said gas bag upon collapse thereof due to external pressure, said reinforcements having substantial rigidity to resist external pressure of liquid, and said gas bag further having three deformable portions in said gas bag side wall of generally uniform thickness between said individual reinforcements.

2. An accumulator in accordance with claim 1 wherein each of the longitudinal reinforcements has a thickness which is greater than said uniform thickness of the deformable portions.

3. An accumulator in accordance with claim 1, in which each of the longitudinal reinforcements comprises two parallel thick portions adjacent to each other.

4. An accumualtor in accordance with claim 1 wherein each of said longitudinal reinforcements comprises a straight wire within the side wall of said gas bag.

5. An accumulator in accordance with claim 1 wherein each of said longitudinal reinforcements comprises a radial arm, the outer end of each arm being secured to the inside wall of said gas bag and the other end of said arm being joined to each of the other arms in the center line of said gas bag.

6. An accumulator comprising a cylindrical liquid tank, a cylindrical gas bag made of a flexible and elastic material and mounted within said tank, the cylindrical wall of said gas bag being longitudinally reinforced at a plurality of equally spaced locations along the periphery thereof in cross section, so that the said reinforced locations resist against external pressure of the liquid to a greater extent than the unreinforced portions of the cylindrical wall of said gas bag, said reinforcement comprising radial arms extending longitudinally within said bag, said arms being of the same material as said bag and integral therewith at said locations along the periphery thereof, and said arms meeting at the center portion of said bag.

References Cited by the Examiner

UNITED STATES PATENTS

| 1,053,933 | 2/1918 | Stowe | 138—119 |
| 1,100,829 | 6/1914 | Joseph | 138—119 |
| 2,283,439 | 5/1942 | Herman | 138—30 |
| 2,380,866 | 7/1945 | Ouerbeke | 138—30 |
| 2,389,791 | 11/1945 | Lippincott | 138—30 |
| 2,397,248 | 3/1946 | De Kiss | 138—30 |
| 2,485,752 | 10/1949 | Laspe et al. | 138—30 X |
| 2,558,770 | 7/1951 | Mercier | 138—30 |

FOREIGN PATENTS 842,835   3/1939   France.

LAVERNE D. GEIGER, *Primary Examiner.*
EDWARD V. BENHAM, *Examiner.*
C. HOUCK, *Assistant Examiner.*